United States Patent [19]

Baumgartner

[11] 4,293,942

[45] Oct. 6, 1981

[54] WATERPROOF WATCH AND METHOD FOR MAKING

[75] Inventor: Hans Baumgartner, Niederrohrdorf, Switzerland

[73] Assignee: BBC Brown, Boveri & Company, Limited, Baden, Switzerland

[21] Appl. No.: 98,684

[22] Filed: Nov. 29, 1979

[30] Foreign Application Priority Data

Dec. 15, 1978 [CH] Switzerland ....................... 12782/78

[51] Int. Cl.[3] ....................... G04B 37/00; B23P 13/00; B23P 11/02

[52] U.S. Cl. ...................................... 368/280; 29/179; 29/447

[58] Field of Search ................. 368/88, 276, 280, 291, 368/309, 319; 29/177–179, 447

[56] References Cited

U.S. PATENT DOCUMENTS

| | | | |
|---|---|---|---|
| 1,980,156 | 11/1934 | Emrick | 29/447 |
| 1,981,334 | 11/1934 | Schmaltz | 29/447 |
| 3,690,002 | 9/1972 | Kasai et al. | 368/280 |
| 3,841,848 | 10/1974 | Kasai et al. | 368/280 |
| 3,911,690 | 10/1975 | Hofer | 368/280 |
| 4,104,867 | 8/1978 | Worsham | 368/291 |
| 4,147,568 | 4/1979 | Marechal | 368/276 |
| 4,155,782 | 5/1979 | Shimotori et al. | 368/280 |
| 4,170,104 | 10/1979 | Yamagata | 368/308 |

FOREIGN PATENT DOCUMENTS

| | | | |
|---|---|---|---|
| 2143978 | 2/1973 | France | 368/280 |

*Primary Examiner*—Vit W. Miska
*Attorney, Agent, or Firm*—Oblon, Fisher, Spivak, McClelland & Maier

[57] ABSTRACT

A waterproof watch having a case and a base which are sealed in a water tight manner without the use of screw threads, is provided. The watch base is composed of a memory form alloy which may or may not be reversible. The watch base is deformed while in its Martensitic state and loosely fit adjacent a sealing portion of the case. The base is then permitted to rise above the Martensit/Austenit conversion temperature into its Austenitic state so that it returns to its undeformed shape and engages the sealing portion of the case in a water tight pressure fitting manner. The conversion temperature should be −20° C. or below. A tubular conduit for the winding stem may also be composed of memory form alloy for sealing engagement with the case.

10 Claims, 4 Drawing Figures

WATERPROOF WATCH AND METHOD FOR MAKING

BACKGROUND OF THE INVENTION

1. Field of the Invention:

The present invention involves watches, in particular wrist watches, and other devices with an encasement enveloping the interior parts of the device, e.g., the watch mechanism, which are sealed in water tight relation to at least one detachable part, e.g., a base.

2. Description of the Prior Art:

The production of guaranteed water tight encasements for watches (e.g. water tight with adjoining external pressures of 3–20 bar) is technically difficult because cutting the usual inter-locking fine threads in the base and encasement of the watches involves high technical demands. In addition, there is also the disadvantage of metal shavings resulting from cutting the threads on the watch or from screwing together the base and encasement after repairing the watch, which could lead to faulty time keeping if the shavings enter the time keeping mechanism.

SUMMARY OF THE INVENTION

The object of the present invention is a device, in particular a watch, with a encasement and at least one part sealing the encasement for water tightness which can be attached to the encasement in a simple, loosely fitting, water tight manner.

In accordance with the invention, this objective is obtained by making the detachable part of the encasement out of an alloy which returns to its shape upon changes in temperature (memory form).

Memory form substances have been known for a long time, as for example those of U.S. Pat. No. 3,012,882 and U.S. Pat. No. 3,174,851 and are used for various purposes such as thermoelectrical switches (e.g., DE-OS No. 2,724,255) and thermal attachment elements in the form of connecting sleeves (e.g., DE-OS No. 2,065,651) which return to the off position.

The technically important uses of memory form alloys known up to now usually assume one time use of the memory form effect as is described in DE-OS No. 2,065,651 for connecting sleeves for the formation of lasting, i.e., practically undetachable, connections. In fact, the erratic change in form of a structure made of memory form alloys that have been mechanically "stressed" by crossing the Martensit/Austenit conversion temperature, is most often a so-called one way effect which cannot be made reversible by thermal means upon heating above the conversion temperature and the resulting "relaxation", i.e., return to the "memory form".

A thermal reversibility, possible to a limited degree, of the memory form effect corresponding to alloys—the so-called "two way effect"—is known for example from DE-OS No. 2,724,255 and can be used beneficially for special purposes such as thermo-electrical switches. The capability of using the memory form effect for the formation of detachable connection has not, however, been recognized by DE-OS No. 2,724,255.

It has also been discovered that memory form alloys are suitable for connections which have to be detachable in their nature, such as the base of a watch's encasement, if the one way effect and not the thermally reversible two way effect is used. A more detailed description of the one way and two way effect is found in DE-OS No. 2,724,255.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
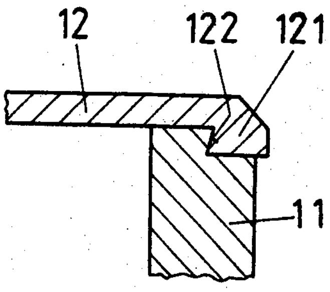
FIG. 1 shows the semi-schematic sectional depiction of the adjoinment of the encasement to its base in one embodiment of the invention.

The base-side end of the encasement 11 of a wrist watch depicted semi-schematically in FIG. 1 encases a watch mechanism (not shown) and is sealed water tight by a base 12 made of a memory form alloy. For this a corresponding base is produced in an essentially known manner, e.g. by a process producing shavings, the base being made of an Ni/Ti or Ni/Ti/Cu or Cu/Al/Ni memory form alloy, which has a Martensit/Austenit conversion temperature of −20° C. or lower. The surrounding bulb or edge 121 of the base 12 is designed with a conic back off 122 which corresponds to an indentation on the base-side end of the encasement 11. Under normal conditions, i.e. in the Austentic state, the base 12 is adjoined to the encasement 11 with water tight pressured fitting. Before attachment, the base 12 is sub-cooled to a temperature below the Martensit-/Austenit conversion temperature and deformed below this temperature by means of an expander until it can be placed loosely onto the encasement 11. The cooled and expanded base 12 is then placed onto the encasement 11 and permitted to warm up to room temperature. Upon exceeding the Martensit/Austenit conversion temperature, the base 12 once again adopts the form it had before expansion ("memory form") and adjoins the encasement 11 in a water tight way.

To remove the base 12 from the encasement 11, e.g. for repairing the watch, the base 12 is cooled with a coolant (e.g. acetone/dry ice mixture) to a temperature below the conversion temperature. If the case 12 consists of a memory form alloy with a two way effect, it again springs back to its expanded form upon crossing the conversion temperature and can simply be lifted from the encasement 11.

If the base consists of a memory form alloy with a one way effect, then only a very small amount of force is necessary to remove it from the encasement. To emplace the base 12 once again, the base 12 is cooled to below the conversion temperature, but is no longer deformed, and is placed loosely upon the encasement 11 and warmed up to room temperature. Once again, upon crossing the conversion temperature, a water tight pressured fitting is obtained between the base 12 and the encasement 11.

Figure 2:
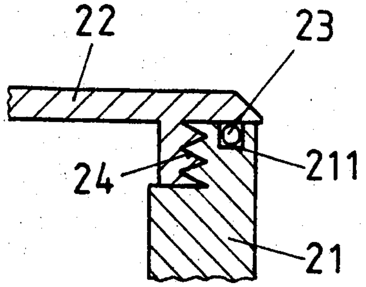
FIG. 2 shows a sectional depiction similar to that in FIG. 1, but of the common prior art screw-type attachment of base and encasement.

For purposes of comparison, in FIG. 2 a common screwtype attachment of the base 22 to the encasement 21 is shown. Regardless of the fact that the threading has to be cut very exactly and there is the danger of shavings when it is screwed onto the encasement, usually an additional sealing element, e.g. an O-ring 23 situated in the corresponding ring-shaped indentation 211 of the encasement 21, has to be used. By using an encasement base made of a memory form alloy, one no longer needs to cut the threads, to form a ring nut, or install a sealing element, which enables savings in costs. Assembly can be simplified as a result and the danger of shavings formation due to the screwing on of the base is eliminated.

Figure 3:
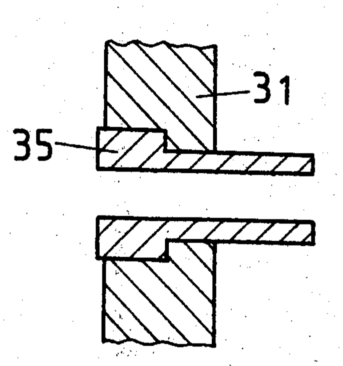
FIG. 3 shows the semi-schematic sectional depiction of the fitting of the part of a watch designed for assembling the winder into the encasement.

Furthermore, with a watch of the type of this invention, the tubular part holding the winder, the so-called "tube" can consist of a memory form alloy. This is depicted semi-schematically in FIG. 3 along with the encasement part 31 in which the tubular winder guidance part is placed. Because the guiding part 35 normally does not have to be removed to repair the watch, the use of a memory form alloy with two way effect, preferred here for the base, brings no special advantages. Because a water tight pressurized fitting is required for the connection between the encasement 31 and the part 35, a part to be assembled 35 made of a memory form alloy is compressed, after cooling to a temperature below the Martensit/Austenit conversion temperature, to the degree that it can be pressure fitted in a water tight manner into the encasement 31 followed by the subsequent crossing of this temperature.

Figure 4:
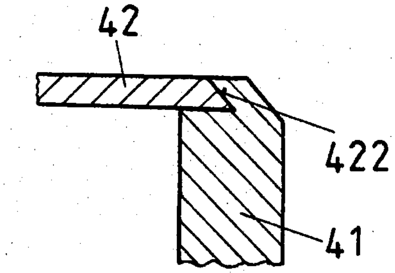
FIG. 4 shows the semi-schematic sectional depiction of the fitting of the encasement and its base in a second embodiment of the invention.

Again semi-schematically, in FIG. 4 an encasement base 42 made of a memory form alloy—with one way effect or, preferably, with two way effect—is depicted in a water tight pressured fitting at the base-side end of an encasement 41, e.g. a watch encasement. The base 42 has a conic back off 422 and grips a correspondingly formed indentation of the encasement 41.

The emplacement and/or removal of the base 42 onto or from the encasement 41 occurs in the same manner as described in connection with FIG. 1 disregarding the fact that the first deformation of the base 42 uses compression means to compress the base and occurs after cooling below the Martensit/Austenit conversion temperature and the water tight pressured fitting is achieved by heating and expanding the base.

In general, the degree of deformation of the base 12, 22 and 42 in the cooled, i.e. Martensitic, states when using memory form alloys with one way effect amounts to about 10% (compared with the corresponding measurement in the Austenitic state) and amounts to about 2% when using memory form alloys with two way effect.

The temperature of the Martensit/Austenit conversion for memory form alloys is frequently not an exactly defined temperature but rather a temperature range of a few degrees Celcius. For the present invention, it is essential that this temperature or this temperature range is entirely below the normally occurring surrounding temperatures so that the possibility of an unintended detachment of the base is eliminated. Accordingly, the conversion from the Martensitic to the Austenitic phase should not occur at temperatures of −20° C. or above, i.e. at normal surrounding temperatures. The conversion temperature, however, can be considerably below this value. Solely for practical reasons (availability of comparatively non-problematic coolants such as acetone/dry ice), the range of −100° C. to −20° C. is preferred for the Martensit/Austenit conversion temperature of the memory form alloy of the encasement base.

Specific examples for suitable memory form alloys are provided below together with their corresponding temperatures for Martensit/Austenit conversions (Ms); all data given in percent refer to weight.

| Alloy | Alloy Composition in % | | | | | Ms (°C.) |
|---|---|---|---|---|---|---|
| | Ni | Ti | Cu | Al | other | |
| 1 | 44 | 45 | 10 | — | Fe: 1 | −21 |
| 2 | 43 | 46 | 10 | — | Cr: 1 | −25 |
| 3 | 55.3 | 44.7 | — | — | — | −20 |
| 4 | 55.4 | 44.6 | — | — | — | −30 |
| 5 | 45 | 44 | 10 | — | Mn: 1 | −20 |
| 6 | 47 | 46 | 4 | — | Fe: 3 | −26 |
| 7 | 3 | — | 82.75 | 14.5 | — | −20 |
| 8 | 3 | — | 82.6 | 14.4 | — | −30 |

EXAMPLE

An encasement base for a man's wrist watch was produced out of a memory form alloy (44.6% weight Ti, 55.4% Ni, Ms=−30° C.) by a process producing metal shavings with passage surfaces similar to that in FIG. 1. The base-sided encasement end was similarly designed according to FIG. 1.

The base was cooled in a mixture of acetone/$CO_2$ ice to about −80° C. at which temperature it was expanded by an expander instrument by about 3.5% and placed onto the encasement. Upon heating it above the conversion temperature, the base sprung again to its form before expansion and formed a water tight seal for the encasement.

It goes without saying that innumerable variations are possible within the framework of the invention. Therefore the alloy mentioned in the example can be replaced with other commonly known memory form alloys. Furthermore, the encasement bases can also be put under pressure by means of compression instead of expansion if the passage surfaces of the encasement and the base are modified accordingly, e.g. in accordance with the schematic depiction in FIG. 4. The forms of the passage surfaces indicated in FIGS. 1–4 with conic back offs can be modified extensively by those skilled in the art as long as the Martensitic form of the memory form alloy put under pressure by the thermal conversion to the Austenitic form produces shearing force and tensile force which are transferred to the encasement and is made effective for a water tight pressured fitting of the parts.

Furthermore, for a watch produced in accordance with the invention other parts requiring sealing beyond the base could also consist of memory form alloys just as the base can be attached in a water tight manner to the encasement by using the memory form effect; this applies particularly also for the part or the parts of the encasement which cause a water tight connection of the watch crystal to the encasement.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A watch comprising:

an encasement; and a base adapted for detachable water tight sealing connection to said encasement, wherein said base is comprised of a reversible memory form alloy.

2. The watch of claim 1 including a tubular member composed of memory form alloy and adapted for accepting a winding stem, wherein said encasement includes a passage through which said tubular member may extend in a water tight sealing connection with said encasement.

3. The watch of claim 1, wherein said memory form alloy is a reversible memory form alloy.

4. The watch of claim 1 or 3 wherein said memory form alloy has a Martensit/Austenit conversion temperature which is not higher than −20° C.

5. The watch of claim 4 wherein said memory form alloy comprises nickel and titanium.

6. The watch of claim 4 wherein said memory form alloy comprises nickel and titanium and copper.

7. The watch of claim 4 wherein said memory form alloy comprises copper, aluminum and nickel.

8. A product comprising:

an encasement including a sealing portion; and a detachable part comprised of a reversible memory form alloy having an Austenitic state and a Martensitic state, said detachable part being adapted to sealingly engage said sealing portion in a water tight pressure fitting manner when in said Austentic state and to change size for releasing said engagement when in said Martensitic state.

9. The product of claim 8 wherein said memory form alloy has a Martensit/Austenit conversion temperature which is not higher than −20° C.

10. A method for the water tight sealing of watches, said method comprising:

providing an encasement including a sealing portion;

providing a detachable part comprised of a reversible memory form alloy having an Austentic state and a Martensitic state with an Austinit/Martensit conversion temperature not higher than −20° C., and being adapted to sealingly engage said sealing portion in a water tight pressure fitting manner when in said Austenitic state;

cooling said detachable part to below said conversion temperature;

deforming said detachable part so that it may loosely engage said sealing portion;

loosely fitting said detachable part upon said sealing portion; and raising the temperature of said detachable part above said conversion temperature so that said detachable part returns to its undeformed shape and sealingly engages said sealing portion in a water tight pressure fitting manner.

* * * * *